March 8, 1960 R. M. ASHBY ET AL 2,928,084

RECORDING SYSTEM

Filed Aug. 30, 1954 6 Sheets-Sheet 1

INVENTORS.
ROBERT M. ASHBY
JOHN P. LEKAS
PAUL N.A. VEENHUYZEN
MEYER POLLACK

BY William R. Lane
ATTORNEY

INVENTORS.
ROBERT M. ASHBY
JOHN P. LEKAS
PAUL N.A. VEENHUYZEN
MEYER POLLACK
BY William R. Lane
ATTORNEY INVENTORS.
ROBERT M. ASHBY
JOHN P. LEKAS
PAUL N.A. VEENHUYZEN
MEYER POLLACK
BY William R Lane
ATTORNEY INVENTORS.
ROBERT M. ASHBY
JOHN P. LEKAS
PAUL N.A. VEENHUYZEN
MEYER POLLACK
BY William R. Lane
ATTORNEY INVENTORS.
ROBERT M. ASHBY
JOHN P. LEKAS
PAUL N.A. VEENHUYZEN
MEYER POLLACK
BY William R. Lane
ATTORNEY INVENTORS.
ROBERT M. ASHBY
JOHN P. LEKAS
PAUL N.A. VEENHUYZEN
MEYER POLLACK
BY William R Lane
ATTORNEY United States Patent Office 2,928,084
Patented Mar. 8, 1960

2,928,084

RECORDING SYSTEM

Robert M. Ashby, Pasadena, John P. Lekas, Hollywood, Paul N. A. Veenhuyzen, San Gabriel, and Meyer Pollack, Los Angeles, Calif., assignors to North American Aviation, Inc.

Application August 30, 1954, Serial No. 452,754

4 Claims. (Cl. 343—10)

This invention relates to the magnetic recording of electrical signals which provide a visual display of concurring fire and flight control information.

Information obtained by means of radar and computed by various electrical and mechanical equipment is generally displayed visually upon the cathode ray tube of an indicator. In this manner, the development of several simultaneous factors can be observed. Subsequent evaluation of tactics can be made, for example, of aerial warfare, in which a pilot completes an attack in accordance with the depicted radar and computer information. Both the steering and gunnery may be carried out by the pilot in accordance with these displays.

Valuable knowledge can be acquired from accurate reproduction of such situations. A magnetic tape recorder is used in this invention, in order to provide a record for reproduction of the evolvement of a particular engagement and its completion.

With the advantage of miniaturized electronics, magnetic recording provides a compact record of the indicator picture. Magnetic tape is highly practicable because it requires no processing or developing and is ready for playback immediately upon recording. Playback of the tape to reproduce the picture provides a method of ready analysis of an aerial engagement. In addition, electrical recording means are more flexible and adaptable to various equipment than are optical systems. Magnetic recording provides the possibility of recording over extended periods of time with a minimum of servicing. It may be desirable to commence or terminate the recording by automatic means, and with predetermined limitations in accordance with the signals being recorded and, thus, make no requirements of the pilot. An electrical system is more conveniently adapted to include such features than is a photographic system. Cockpit light, of course, has no effect on magnetic recordings while it directly affects film recordings, unless dual optical systems for pilot and camera are used. The storage and handling of magnetic tape does not involve the problems raised by film recordings such as loading and unloading the magazines which, in the case of magnetic tape requires no extra precautions.

It is therefore an object of this invention to provide a magnetic recording system for a fire and flight control display.

Another object of this invention is to provide a method of magnetically recording cathode ray tube pictures.

A further object of this invention is to provide automatic recording of concurrent radar and computer information.

Other objects of invention will become apparent from the following description taken in connection with the accompanying drawings, in which Fig. 1 is a block diagram of the flow of information between radar, computers, controller, data converter and various fire and flight control equipment;

Figure 9:
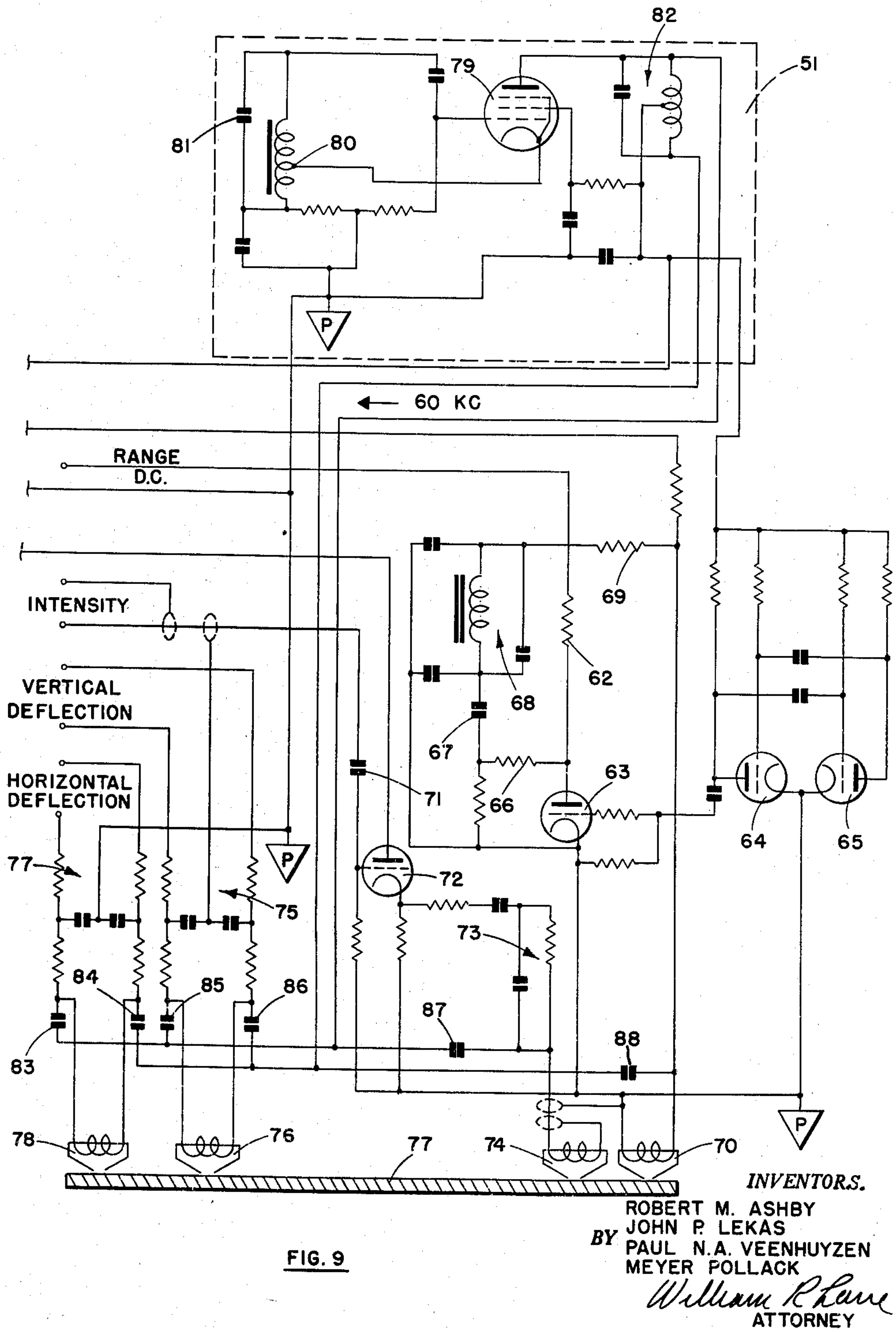

And Fig. 9 is an electrical schematic of the magnetic recorder oscillator and recording circuits.

Figure 1:
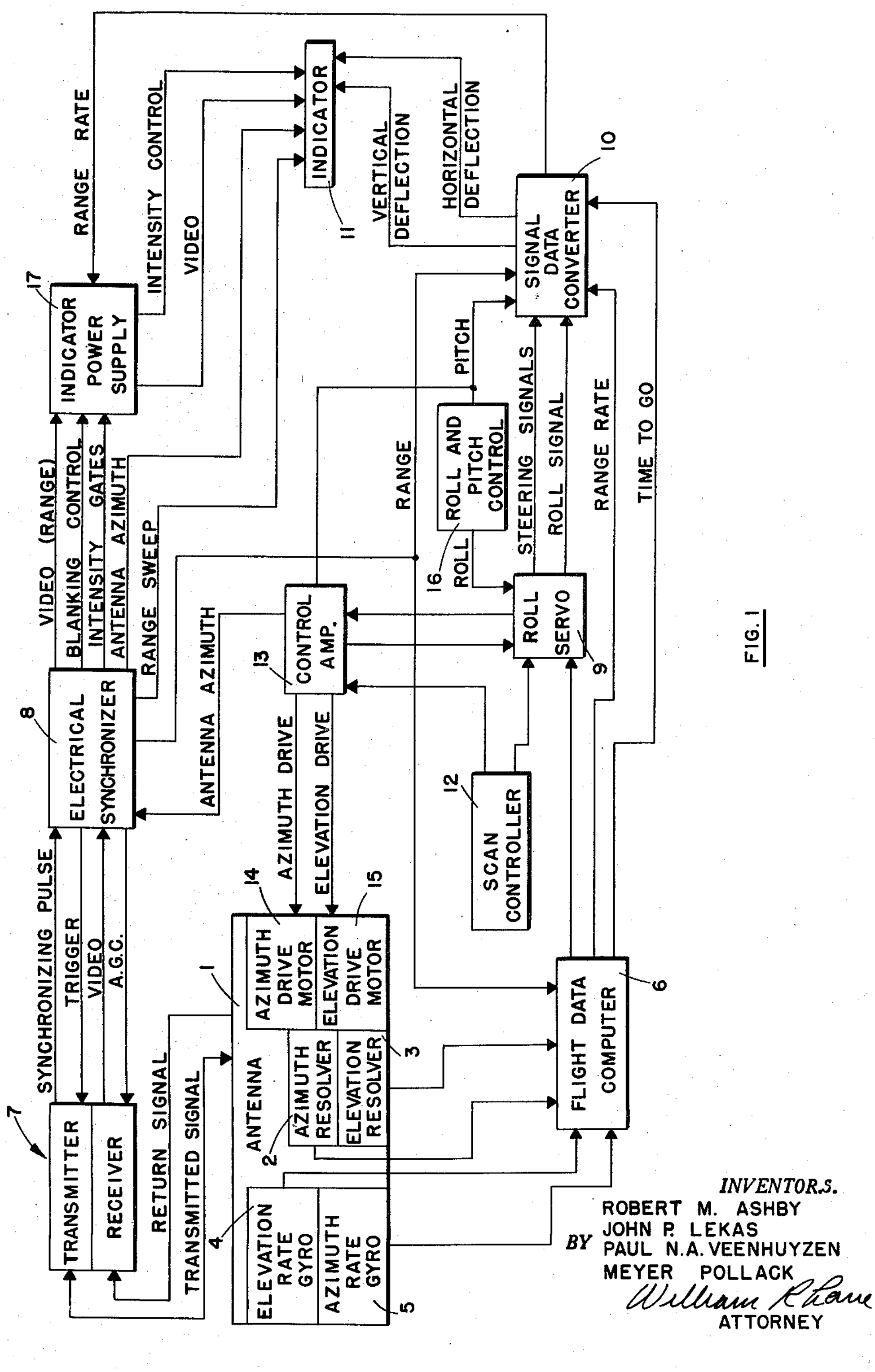

Referring to Fig. 1, a radar antenna 1 has resolvers 2 and 3 mounted to indicate the azimuth and elevation angles, respectively, with regard to the airframe. Also, there are two rate gyros 4 and 5 which indicate angular velocities of the antenna. These signals are received by the flight data computer 6 and, together with range from the radar 7 through electrical synchronizer 8, provides information from which may be computed the desired steering course to complete an attack upon a detected target. Various flight instruments such as altimeter, vertical accelerometer, pitch and roll indicators may also be used to provide the desirable information to flight data computer 6 for solution of the fire and flight control problem. From these several sources of information, the computer continuously provides electrical signals indicating the steering of the aircraft. These signals pass through roll servo 9 and are transmitted to signal data converter 10 which is connected to provide the deflection plates of indicator 11 with vertical deflection and horizontal deflection signals. These signals are steering signals which deflect a steering dot on the indicator display. Deviation of the steering dot from the center of the picture represents an error in azimuth or elevation headings of the aircraft from the attack course. As the pilot steers to correct the error, new data received at the flight data computer causes the steering dot to move to the center of the display. In this way, the pilot arrives at and maintains a proper attack course. Flight data computer 6 also furnishes range rate information to signal data converter 10 which, in turn, passes it to indicator power supply 17 for intensity control of indicator 11. Scan controller 12 provides signals to control the motion of antenna 1 through control amplifier 13. Drive signals are received from control amplifier 13 by antenna drive motors 14 and 15. Roll and pitch control 16 provides pitch information to signal data converter 10 and roll information to roll servo 9 for stabilizing the various signals. Electrical synchronizer 8 provides the time reference for the system. It receives synchronizing pulses and video signals from the radar and provides trigger pulses and automatic gain control. Further, it provides the video (range) signal, and blanking and gating signals to indicator power supply 16 for intensity control of indicator 11. Range sweep is furnished indicator 11 directly by electrical synchronizer 8.

Figures 2, 3, 4, 5:
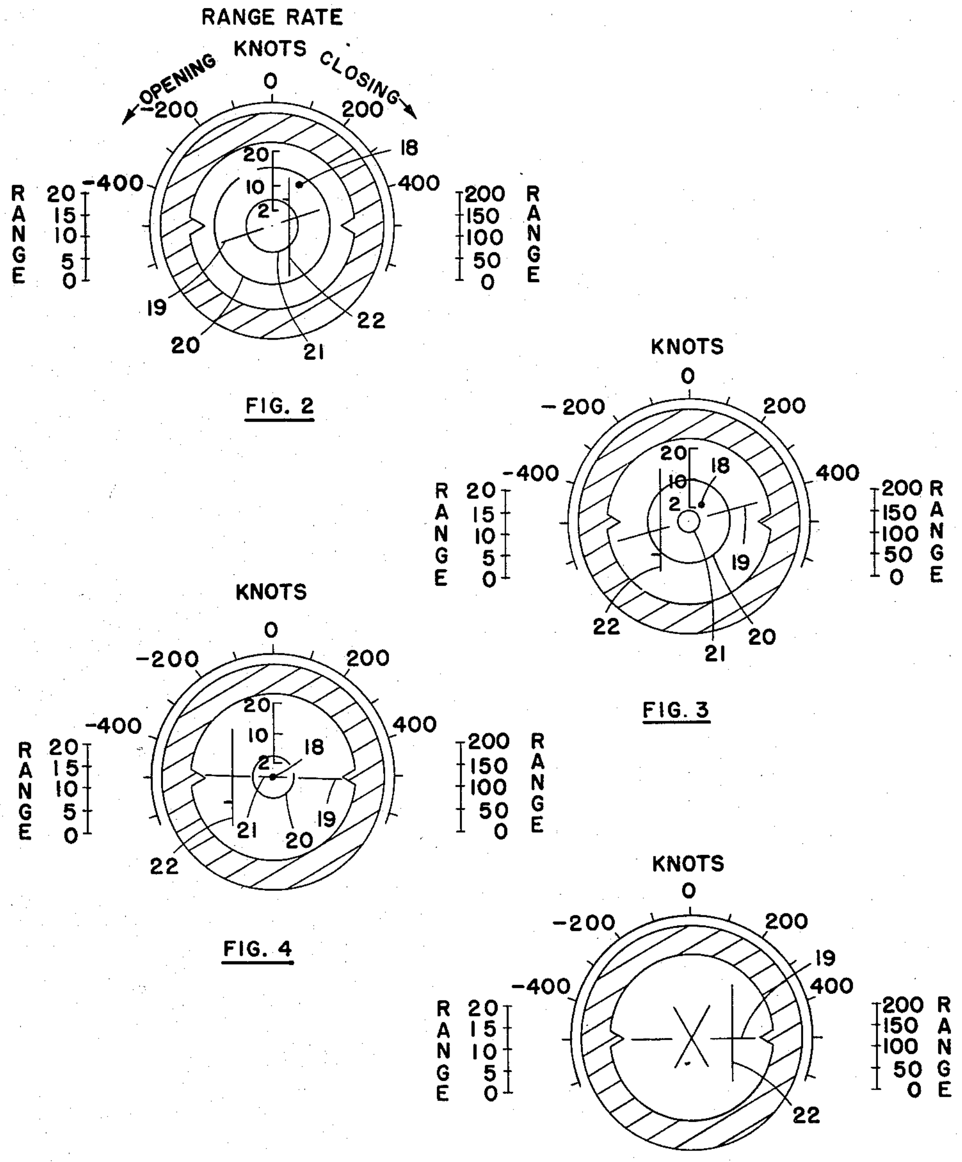
Fig. 2 is a representative indicator display early in an attack.
Fig. 3 is a representative indicator display later in an attack.
Fig. 4 is a representative indicator display still later in an attack.
Fig. 5 is a representative indicator display at firing time.

Signal data converter 10 includes circle generators which furnish signals producing a reference circle and a time circle on indicator 11. It further provides an artificial horizon for indicator 11. Referring momentarily to Fig. 2, an example of an indicator cathode ray tube display is shown. The error dot 18 is indicated upward and to the right from the center of the display. The tilt of horizon line 19 indicates the plane is in a right bank. The radius of time circle 20 indicates that it is approximately 16 seconds until firing time (time-to-go). The blanking, or gap, in time circle 20 indicates the range rate is 100 knots (opening). Reference circle 21 grows smaller as does time circle 20 as time-to-go decreases.

In other systems, the reference circle may jump to successively smaller sizes. Range sweep 22 indicates by a pip according to the range scale at the left that the target is at 18 miles. The sweep 22 further indicates by its lateral position that the target is to the right. The time circle 20 is generated in the signal data converter 10, Fig. 1, and is blanked by the blanking signals of indicator power supply 17 in accordance with range rate signals received through signal data converter 10 from flight data computer 6. The signal data converter also provides the deflection of the steering dot 18 according to steering signals received through roll servo 9 from flight data computer 6, as previously described.

These various reference figures are displayed on indicator 11 on a time-sharing basis, with the exception of the range sweep 22. The vertical and horizontal deflection outputs of signal data converter 10 generate the time circle 20, the reference circle 21, steering dot 18 and the horizon line 19 of Fig. 2. Mechanical relays provide switching from each of these to another at such speed to cause the superimposed forms to appear as a single picture. During the transition from one time-shared figure to another, the cathode ray tube is gated and the figure itself may be partially blanked for certain purposes. The gating and blanking provides for smooth transition from one figure to the next and the removal of undesired traces from the face of the cathode ray tube. The range sweep 22 and its pip may be produced and superimposed by a second gun within the cathode ray tube connected in conventional B-scope fashion, the antenna azimuth search position being obtained from synchronizer 8.

Fig. 3 indicates from time circle 20 that time-to-go is 10 seconds and that the range is closing at 200 knots. The plane is in a right bank according to horizon line 19. There is less steering error in Fig. 3 than Fig. 2, dot 18 being nearer the center of reference circle 21. The range sweep 22 indicates, according to the short range scale that the target is at 5 miles and to the left.

In Fig. 4, the time circle 20 indicates about 4 seconds to go until firing time, and the range is closing at 400 knots. The reference circle is so small it appears as a line at the center of the scope and the steering error dot 18 is centered. This indicates that there is no deviation by the attacking aircraft from the attack course.

Fig. 5 illustrates a display which is generated when firing time is reached and pull-out is to be made.

Figure 6:
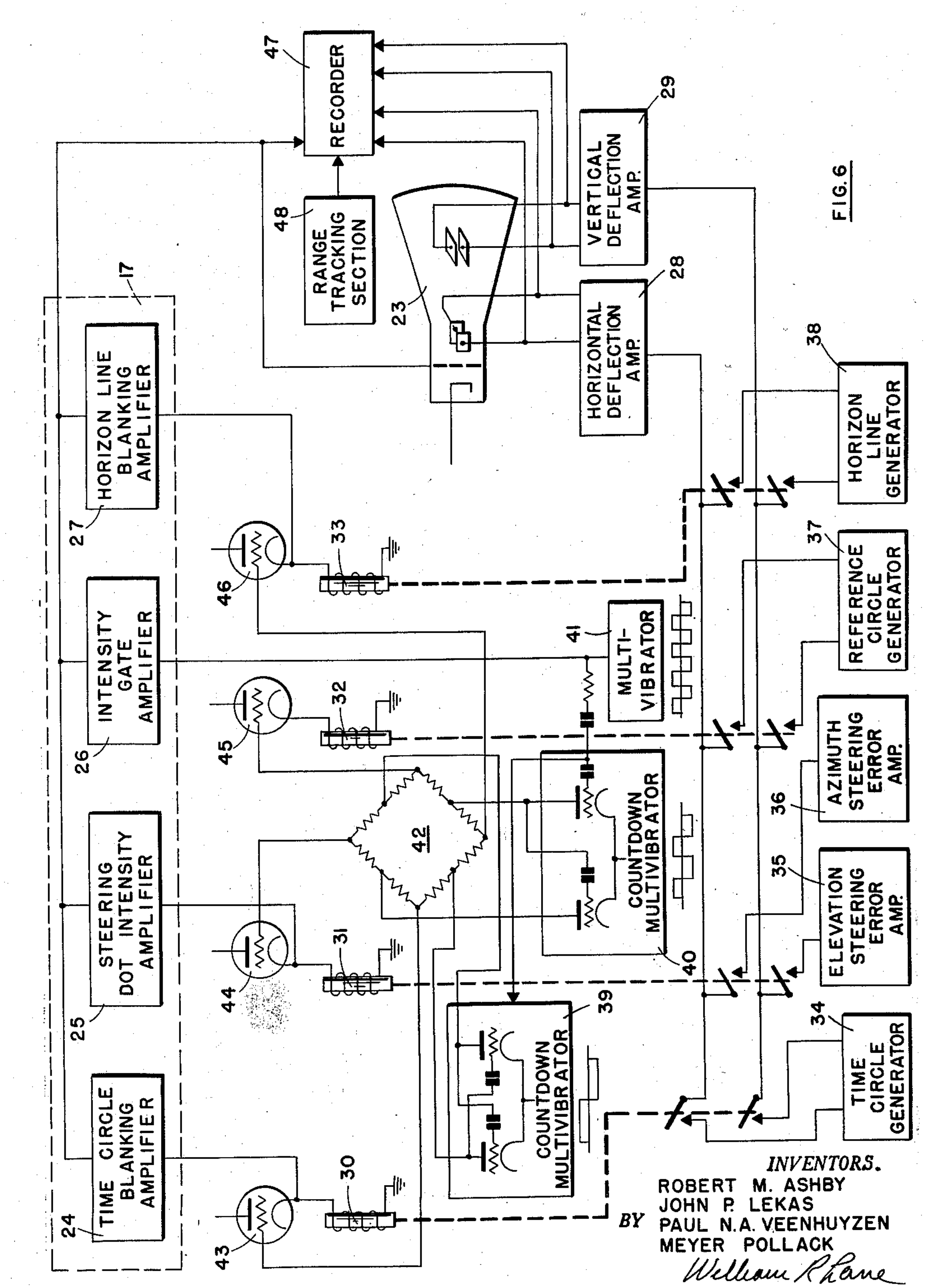
Fig. 6 is a block diagram of indicator connections and time sharing networks showing the recorder connections.

Fig. 6 illustrates the various circuits providing information to the cathode ray tube 23. The grid of the cathode ray tube receives intensity signals from various blanking, or intensity amplifiers 24, 25, 26 and 27 which provide smooth transition from one time-shared signal to another. The deflection plates receive signals from horizontal deflection amplifier 28 and vertical deflection amplifier 29. These amplifiers receive inputs through switches operated by relays 30, 31, 32, and 33 which time shares between the time circle generator 34, elevation steering error amplifier 35, azimuth steering error amplifier 36, reference circle amplifier 37, and horizon line generator 38. The input to horizontal and vertical deflection amplifiers 28 and 29 is switched by these relays, in succession, to the time circle, steering error dot, reference circle, and the horizon line generator. The rate of switching is governed by multivibrators 39, 40, and 41. The pulse frequency ratio of these multivibrators is 1:2:4, respectively. Multivibrator 41 provides a reference for driving intensity gate amplifier 26. Multivibrators 39 and 40, connected to bridge circuit 42, cause tubes 43, 44, 45, and 46 to conduct in succession, energizing relays 30, 31, 32, and 33 in succession. The blanking, or gating, signal for each successive figure, time circle, error dot, reference circle, and horizon line, is obtained by amplifiers 24, 25, 26, and 27 from cathode followers 43, 44, 45, and 46.

The signals recorded by recorder 47 are the blanking, or gating, signals from the various amplifiers (the gating signals being synchronized with the time sharing of the deflection amplifiers) and the vertical and horizontal deflection signals received from amplifiers 28 and 29. These signals, when reproduced on an indicator will provide the displays illustrated in Figs. 2, 3, 4, and 5, as the case may be, with the exception of the range sweep 22 in those figures. In this instance, only a D.-C. voltage representing range is recorded; taken from the range tracking section 48 of electrical synchronizer 8.

Figure 7:
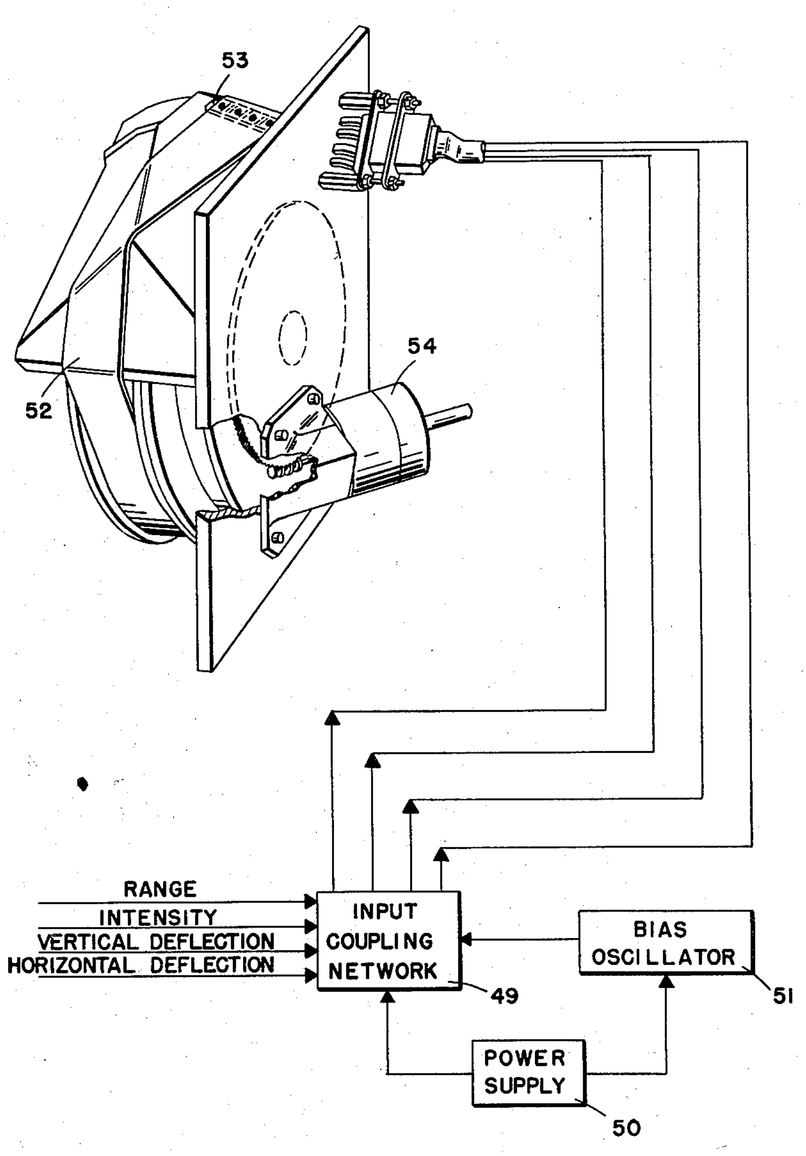
Fig. 7 is an illustration of the magnetic recorder and a block diagram of the electrical portion.

Fig. 7 illustrates the deflection, range, and intensity signals received at the input coupling network 49 which, with the aid of power supply 50 and bias oscillator 51 records these signals on magnetic tape 52 which passes over four-channel recording unit 53. The tape reels are driven by motor 54.

Figure 8:
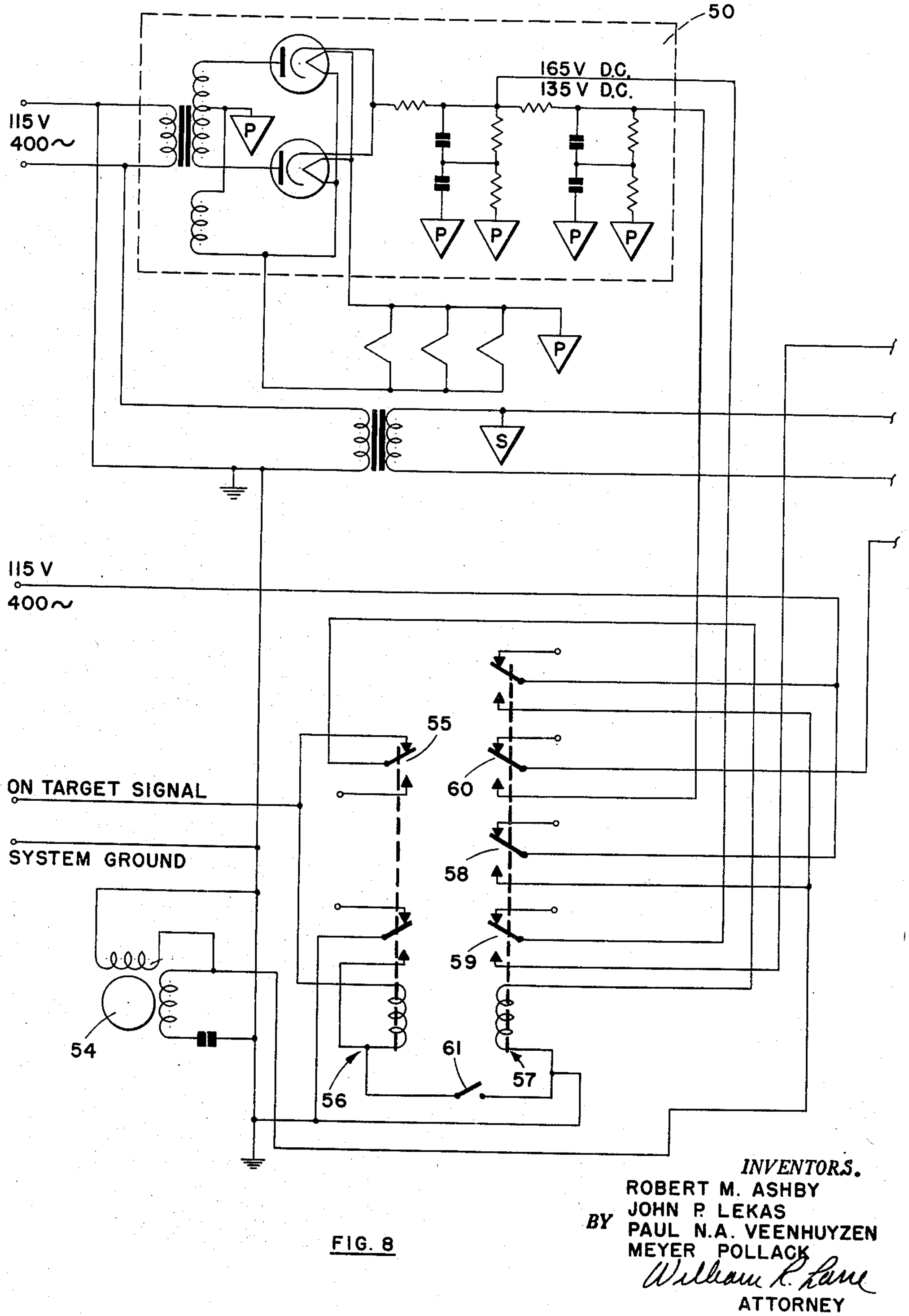
Fig. 8 is an electrical schematic of the magnetic recorder power supply and switching section.

A more detailed schematic diagram of the electrical switching and power portion of the recorder is illustrated in Fig. 8. In the lower left corner, split-phase motor 54 drives the recorder tape reels. Switch 55 of relay 56 provides connection to energize the coil of relay 57 when the radar provides an "on target" signal. Switch 58 of relay 57 connects the motor 54 to a 115 volt source during the time the aircraft is airborne. While relay 57 is energized, switches 59 and 60 provide plate power to the various tubes. It may be desirable not to disconnect plate power in order to get a gradual decay of bias oscillator voltage to reduce head magnetization which would remain on sudden removal of power. Power supply 50 provides full wave rectified filtered output. In addition, it provides filament voltages for the other three tubes of the recorder. Switch 61 is a tap sensing switch which closes when the recorder runs out of tape. When switch 61 is closed, relay 57 cannot be energized and motor 54 will not be driven.

As shown by the break lines, Fig. 8 and Fig. 9, connect together. In Fig. 9, an electrical schematic of the recording portion of the recorder, range is received as a D.-C. voltage and is impressed through resistor 62 on the plate of tube 63. The grid of tube 63 is connected to a free running multivibrator consisting of tubes 64 and 65. At regularly spaced intervals, tube 64 conducts and provides a negative pulse to the grid of tube 63. During the interval of non-conduction by tube 64, tube 63 is conducting, at which time its plate is substantially at cathode potential. The range signal is thus chopped to ground. The chopped range signal passes through resistor 66 and capacitor 67 which is the input to a low pass filter, Parallel resonant circuit 68 presents maximum impedance to the signal at the third harmonic of the chopped frequency. The signal passes through resistor 69 to recording head 70.

The indicator intensity signal is received by the recorder through capacitor 71 at the grid of tube 72 which is operated as a cathode follower. The intensity signal passes to parallel R.-C. circuit 73 which increases the gain of the higher frequency intensity pulses, and the signal is impressed on tape by recording head 74.

The vertical deflection signal is received at a balanced R.-C. network 75 which attenuates the signal to a proper level for recording by recording head 76. The horizontal deflection signal is, likewise, attenuated by another R.-C. network 77 and is recorded by recording head 78. To aid in recording, a bias frequency is provided by bias oscillator 51 which consists of tube 79 having a tuned grid circuit comprising inductor 80 and capacitor 81. A constant current is provided at a high frequency, for example, 60 kilocycles. This bias frequency provides a linear relationship between the signals to be recorded and the magnetization of the tape. The output of the oscillator is taken from tank circuit 82. The recording bias is coupled into the horizontal deflection circuit through capacitors 83 and 84 and it is coupled into the vertical deflection circuit through capacitors 85 and 86. Capacitor 87 couples the recording bias into the intensity channel, and capacitor 88 couples the signal into the range channel. Tape 77 is shown in cross section moving under the heads.

Information magnetically recorded, as taught herein, provides ready reference for reconstruction of cathode ray tube displays. If the display is a composite picture, the blanking and gating signals are simultaneously recorded with the deflection signals. The ease with which magnetic tape can be handled compared to photographic film renders magnetic recording the more practicable of the two.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a combination, flight control system providing information in the form of several electrical signals each presented on a time-sharing basis, said signals representing the horizontal and vertical deflection of the beam of a cathode ray tube, means providing blanking signals synchronized with the time sharing of said electrical signals, recorder means connected to record in separate channels said horizontal and vertical deflection signals and the output of said blanking means.

2. In combination, a fire and flight control system for an aircraft wherein a radar provides electrical signals indicating the range and bearing of a target and a computer provides electrical signals indicating the horizontal and vertical steering error of said aircraft, means for generating electrical signals representing at least two reference figures for said radar-provided electrical signals, means for time-sharing said generated electrical signals and said radar-provided electrical signals, means for producing blanking and gating signals for said electrical signals, said blanking and gating means being synchronized with said time-sharing means, and multichannel magnetic recorder means connected to record said blanking and gating signals, said signals representing reference figures, and said steering error signals, and wherein said blanking and gating signals are recorded separately from the remainder of said electrical signals.

3. In combination, a fire and flight control system for an aircraft wherein a radar provides electrical signals indicating the range and bearing of a target, said radar including a vertical deflection amplifier which provides electrical signals as to the vertical deflection of the beam of a cathode ray tube, said radar further including a horizontal deflection amplifier which provides electrical signals as to the horizontal deflection of the beam of a cathode ray tube, means for generating electrical signals providing the vertical and horizontal deflection components of at least one reference circle, means for generating electrical signals providing the vertical and horizontal deflection components of a horizon line, means for generating signals representing the steering error of said aircraft, means for switching said vertical and horizontal amplifiers on a time-sharing basis, successively, to said reference circle signals, said horizon line signals and said steering error signals, means providing blanking and intensity gating signals for said time-shared signals, and multichannel recorder means connected to record said blanking and intensity gating signals in one channel, the vertical deflection signal in another channel and the horizontal deflection signal in a third channel.

4. In combination, a fire and flight control system for an aircraft wherein a radar provides electrical signals indicating the range and bearing of a target, and a computer is connected to receive the output of said radar and provide vertical deflection electrical signals and horizontal deflection electrical signals indicating the horizontal and vertical steering error of said aircraft, means for generating a vertical deflection signal and a horizontal deflection signal representing a reference figure for said computer signals, a cathode ray tube connected to receive and display the output signals of said computer and said means for generating a reference figure, means for time-sharing said electrical signals and said generated signals, means for producing blanking and gating signals for said computer signals and said generated signals, said blanking and gating means being synchronized with said time-sharing means, multichannel magnetic recording means connected to record said vertical deflection signals in one channel, said horizontal deflection signals in another channel, and said blanking and gating signals in a third channel.

References Cited in the file of this patent

UNITED STATES PATENTS

| | | |
|---|---|---|
| 2,262,245 | Mozeley et al. | Nov. 11, 1941 |
| 2,405,231 | Newhouse | Aug. 6, 1946 |
| 2,603,775 | Chipp | July 15, 1952 |
| 2,679,035 | Daniels et al. | May 18, 1954 |
| 2,689,952 | Johnson, Jr., et al. | Sept. 21, 1954 |
| 2,698,875 | Greenwood | Jan. 4, 1955 |
| 2,714,202 | Downing | July 26, 1955 |